United States Patent [19]
McAllister

[11] Patent Number: 5,927,633
[45] Date of Patent: Jul. 27, 1999

[54] RESILIENTLY BIASED PARKING SEAT FOR RECEIVING THE LEADER PIN OF A SINGLE REEL TAPE CARTRIDGE

[75] Inventor: Jeffrey S. McAllister, Boise, Id.

[73] Assignee: Hewlett-Packard Company, Palo Alto, Calif.

[21] Appl. No.: 09/121,273

[22] Filed: Jul. 22, 1998

[51] Int. Cl.$^6$ .................................................. G11B 23/037
[52] U.S. Cl. ...................................... 242/348.2; 242/332.4
[58] Field of Search ................................. 242/348, 348.2, 242/248.3, 332.4, 332.7, 332.8

[56] References Cited

U.S. PATENT DOCUMENTS

| | | |
|---|---|---|
| 4,273,454 | 6/1981 | Anagnostopoulos . |
| 4,477,851 | 10/1984 | Dalziel et al. ..................... 242/332.4 |
| 4,542,864 | 9/1985 | Hart . |
| 4,852,825 | 8/1989 | McGee . |

FOREIGN PATENT DOCUMENTS

1 547 015  10/1969  Germany ............................ 242/332.4

*Primary Examiner*—John P. Darling

[57] ABSTRACT

A resilient parking seat for the leader device of a single reel tape cartridge is provided which works in combination with a tape supply reel lock having discrete, evenly-spaced locking positions. The parking seat includes a cradle assembly, which is shaped to receive the leader device. The cradle assembly, mounted in a recess within a tape access port in the cartridge housing, is linearly slidable between two limiting positions along a path that is approximately coincident with that of the tape as it enters or exits the cartridge housing. The cradle assembly is biased with at least one biasing spring in a tape exiting direction, so that when the tape is completely rewound into the cartridge, the leader device enters the access port, makes contact with the cradle assembly, causing the cradle assembly to slide within the recess and compress the biasing spring(s). Compression of the biasing spring(s) is maintained by a rewind mechanism of a tape drive as the reel lock is engaged. Linear travel of the cradle assembly is sufficient to overcome any slack that might ordinarily be introduced into the tape by disengaging the cartridge from the rewind mechanism. The resilient parking seat also reduces the shock forces to which the tape is subjected as the leader device slams into the parking seat at the end of a rewind operation. A large portion of the momentum of the spinning supply reel loaded with the rewound tape and of the leader device is absorbed by compressing the biasing spring(s), momentum which would otherwise be absorbed by stretching the tape.

20 Claims, 6 Drawing Sheets

RESILIENTLY BIASED PARKING SEAT FOR RECEIVING THE LEADER PIN OF A SINGLE REEL TAPE CARTRIDGE

This application is related to U.S. utility patent application Ser. No. 09/033,352, filed on Mar. 2, 1998, and to U.S. design patent application Ser. No. 29/084,903, filed on Mar. 11, 1998.

FIELD OF THE INVENTION

This invention relates to data storage tape cartridges and, more specifically, to the parking of a data storage tape in a single reel cartridge before the tape cartridge is removed from the tape drive.

BACKGROUND OF THE INVENTION

The evolution of tape backup systems is similar to that of many computer components. At first, reel-to-reel systems (somewhat similar to old reel-to-reel audio tape recorders) were used to store data. In 1972, more than a decade before the introduction of the first IBM-PC, the 3M Company introduced the first quarter-inch tape cartridge designed for data storage. This pioneering cartridge from 3M was a dual-reel design. Somewhat more than a decade later, the first single reel tape cartridges and single reel cartridge tape drives were introduced.

Most single reel cartridges include a housing which encloses a single supply reel onto which a magnetic tape is wound. A terminator, or leader, device is generally attached to the free end of the magnetic tape. The leader device has a cross section that is larger than that of the tape, allowing it to be captured by a leader device seat within the housing whenever the tape is rewound onto the supply reel. The leader device may be in the shape of a block, a sphere, a spheroid, a rod or even a T-shaped tab. The reel has a central drive hub which is exposed by a central aperture within the housing. When the cartridge is inserted in a tape drive, a drive spindle engages the drive hub, and a priming mechanism within the drive captures a free end of the tape and either directly or indirectly threads the tape over the tape drive's read/write head and attaches the tape to a take-up reel located within the tape drive. The tape is then accessed (i.e., read and written to) in a conventional manner. After the tape has been accessed by the drive, the magnetic tape is rewound onto the cartridge's single supply reel and detached from the take-up reel so that the cartridge may be removed from the drive. This is in contrast to the dual reel tape cartridges which have both a supply reel and a take up reel incorporated therein.

Single reel tape cartridges are becoming a popular alternative to dual reel cartridges because the single reel cartridges are less expensive to manufacture and require less storage space. In fact, single reel cartridge drives are rapidly becoming the preferred design for high-capacity tape-based data backup solutions for data processing systems. Using 600 meters of 12.7 mm-wide tape wound on an 100 mm diameter reel, a single reel cartridge can store approximately 100 gigabytes of uncompressed data and approximately 200 gigabytes if compressed.

There are several disadvantages associated with the use of single reel tape cartridges. One disadvantage is increased tape drive complexity. Unlike a dual reel cartridge in which the magnetic tape is permanently attached to both reels, a single reel cartridge must be "primed", just like the reel-to-reel audio tape player/recorders that were popular forty years ago. That is, the leader device must somehow be grasped, and the attached magnetic tape threaded over the read/write head, and attached to the take-up reel. Whereas for the reel-to-reel machines, this process was accomplished by human dexterity, the process for single reel cartridges is performed automatically by a priming mechanism. The operation of a priming mechanism used for a preferred embodiment of a single reel cartridge will subsequently be briefly described. Because of the non-trivial nature of these tasks, the priming mechanism is a complex device which increases the cost of the tape drive and adds another failure mode to the tape system.

Another problem single reel drives have is that they place stress on the tape when it is rewound and the leader device is parked. This is because the cartridge reel when completely loaded with the rewound tape has considerable angular momentum. Thus, when the leader device is caught as the tape becomes fully rewound with the cartridge reel spinning, the magnetic tape may be stretched or broken by the shock loading. Consequently, most single reel tape drives currently in production dramatically reduce rewind speed as the tape approaches the fully rewound condition in order to reduce the angular momentum to safe levels which will not break or permanently stretch the tape.

Another problem related to the use of single reel tape cartridges involves the need to maintain tension on the tape after the cartridge has been removed from the tape drive mechanism. Although reel locking mechanisms have reduced the amount of slack that can be introduced, tension cannot be maintained because the locking mechanisms generally in use are not rotationally continuous, but have a plurality of discreet locking positions. If tension is not maintained, the outer layers of tape will become loose and may slip. Not only will this slippage result in a certain amount of tape feed misalignment, but contact between tape edges and the supply reel flange may cause increased tape wear and some additional friction as the tape is unwound from the supply reel.

Figure 1:
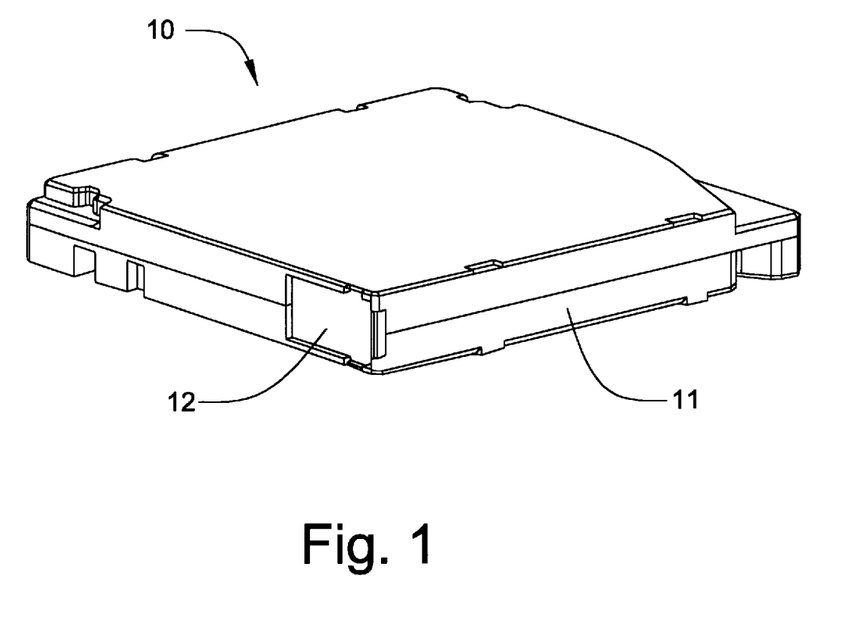
FIG. 1 is a perspective view of a single reel tape cartridge, showing the top and sides thereof.
Figure 2:
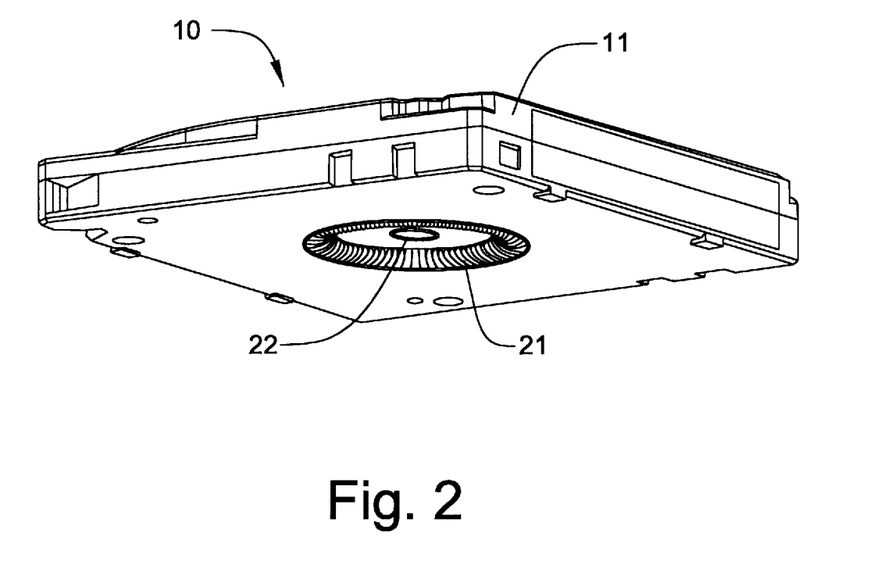
FIG. 2 is a perspective view of a single reel tape cartridge, showing the bottom and sides thereof.

A single reel tape cartridge 10 is depicted in FIGS. 1 and 2. The cartridge 10 includes a housing 11 which encloses a tape supply reel. A sliding door 12 covers the tape access port and leader device parking place (neither of which are shown in this view). The door 12 slides to the side in order to expose the tape access port when the single reel tape cartridge 10 is inserted in a tape drive. A driven gear (also referred to herein as a driven coupler) 21 is incorporated in the central hub of the tape supply reel (the tape reel itself is enclosed by the housing 11 and is not visible in this view). The driven gear 21 engages a driver gear (also referred to herein as a driver coupler) which is part of the tape drive (the driver gear is not shown). It will be noted that the driven gear has a central aperture 22 through which a reel locking mechanism within the cartridge 10 may be released. Although driver and driven gears are utilized for imparting rotary motion to the supply reel other types of couplers using splines or friction may be substituted for the geared type.

Figure 3:
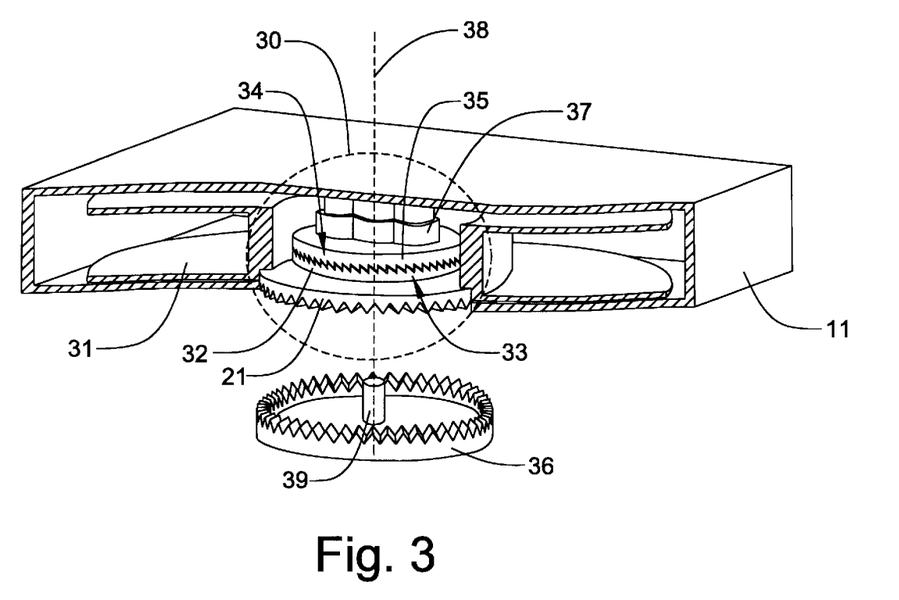
FIG. 3 is a perspective cut-away view of a single reel tape cartridge having an internal reel locking mechanism which is engaged to lock the reel.
Figure 4:
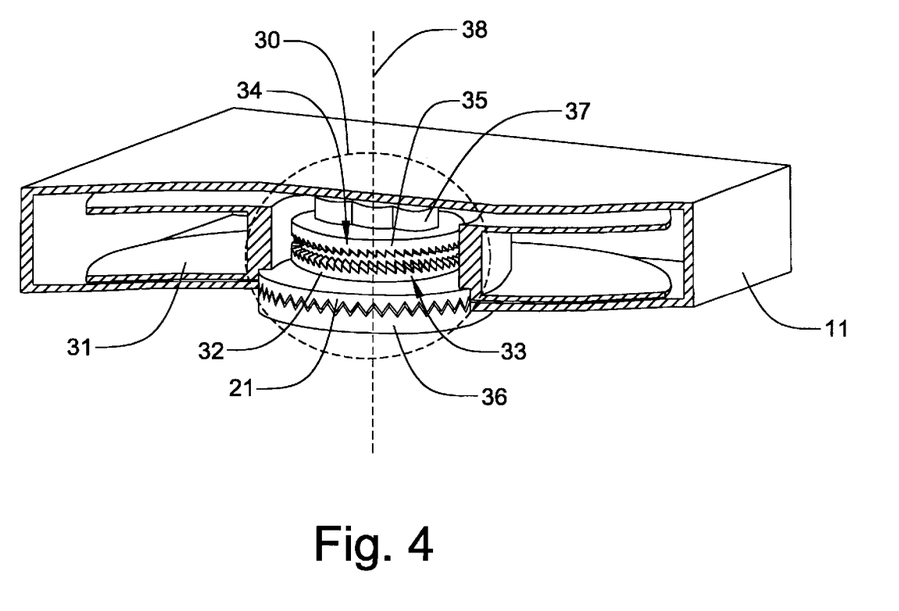
FIG. 4 is a perspective cut-away view of the single reel tape cartridge of FIG. 3, but with the internal reel locking mechanism disengaged to free the reel.

A reel locking mechanism 30 is depicted in a cut-away view of the single reel cartridge of FIGS. 3 and 4. The driven gear 21 is rigidly affixed to the reel 31. The backside of the driven gear 21 (i.e., the side which does not engage the driver gear 21) has a first locking gear 32 rigidly affixed thereto. The first locking gear 32, which has a first set of teeth 33, is centered about the reel's axis of revolution 38, and rotates with the reel 31 and driven gear 21. The first set of teeth 33 of the first locking gear 32 engage a second set of teeth 34 on a second locking gear 35 when the driven gear 21 is decoupled from the driver gear 36 of the tape drive. The second locking gear 35, which is non-rotatable and slidably mounted on a pedestal 37 rigidly affixed to the drive housing 11, is resiliently biased toward the first locking gear 32 along the rotational axis 38 of reel 31. Resilient biasing of the second locking gear may be provided by a coil spring (not shown) within the pedestal 37 which is compressed between the pedestal and the second locking gear 35. When the driver gear 36 of the tape drive engages the driven gear 21, a projection 39 on the top of the driver gear 36 passes through a center aperture in the driven gear 21, lifting the second locking gear 35 a distance at least sufficient to disengage its teeth from those of the first locking gear 32. Each tooth of the first and second sets of teeth (33 and 34, respectively) are preferably ramp shaped so that when the teeth of both locking gears are engaged, rotation of the reel 31 in an unwind direction is blocked. At least one of the locking gears must have a full complement of equally-spaced teeth. As there are a finite number of teeth on each locking gear, the reel 31 may be locked in a plurality of positions equal to the number of teeth on a locking gear having a full-complement of teeth. The angular distance between each locking position will be equal to 360 degrees divided by the total number of locking positions. For example, if each of the locking gears has a total of 60 teeth, the reel may be locked in 60 different angular positions, six degrees apart, as it is rotated. Thus, when the tape is rewound completely and still taught, that same degree of tautness will remain only if the teeth of both locking gears are perfectly aligned with one another. If the gears are not perfectly aligned, up to six degrees of slack are possible. The linear slack in the tape may be readily calculated. For example, the maximum amount of slack in a tape on a reel having an outermost loop with a diameter of 100 mm and a circumference of approximately 314 mm will be about 314/60, or about 5 mm. Although the amount of tape slack will average half that amount, or about 2 mm, the system must be able to cope with the worst-case scenario of 5 mm. Tape slack of 5 mm may cause significant tape slippage. One might reasonably assume that by increasing the number of teeth on the locking gear, tape slack could be reduced. Although this is theoretically correct, there is a limit to the number of teeth (particularly plastic teeth) that may be placed on the locking gear before the teeth are likely to strip and become useless with repeated use.

What is needed is an improved tape leader device parking mechanism which will not only reduce stresses on the magnetic tape or on a leader tape attached to the magnetic tape when the leader device is captured in its parking place under rewind conditions, but which will also maintain tension on the tape after it has been rewound into the cartridge, removed from the tape drive, subjected to handling which may be not particularly gentle, and stored for extended periods of time in varying temperature conditions.

SUMMARY OF THE INVENTION

The present invention provides a resilient parking seat for the leader device of a single reel tape cartridge. The invention works in combination with a reel lock having discrete evenly-spaced locking positions. For a preferred embodiment of the invention, the leader device is a pin shaped like a dumbbell, and the parking seat includes a cradle assembly that is shaped to receive the ends of the pin, and which is slidably mounted in a recess within a tape access port in the cartridge housing. The cradle assembly is slidable between two limiting positions along a path that is largely coincident with movement of the tape as it enters or exits the cartridge housing. The cradle assembly is biased with at least one biasing spring in a tape exiting direction, so that when the tape is completely rewound into the cartridge, the leader pin makes contact with the cradle assembly, causing the cradle assembly to slide within the recess so that the biasing spring(s) is (are) compressed.

During a rewind operation, the resilient parking seat is in a state of compression when the tape is fully rewound and the leader pin is seated in the cradle assembly. Before the coupler of the cartridge is disengaged from the rewind mechanism, the reel lock is engaged while the parking seat is in a compressed state. The travel of the parking seat is sufficient to overcome any slack that might ordinarily be introduced into the tape by the disengaging the coupler from the rewind mechanism.

In addition to preventing the rewound tape from becoming slack, the resilient parking seat has the added advantage of cushioning the shock to which the leader tape is subjected as the leader pin slams into the parking seat at the end of a rewind operation. A large portion of the momentum of the spinning supply reel loaded with the rewound tape and of the leader pin is transferred to the biasing spring(s) as they compress rather than to the leader tape as it stretches, and the kinetic energy associated with the reel, tape and leader pin is dissipated by friction as the cradle assembly slides within the recess. Although some bounce is inevitable as the leader pin enters the cartridge recess and slams into the resilient seat, the bouncing effect assists in the frictional dissipation of the kinetic energy. This shock absorbing feature greatly reduces the tendency of the tape to break and stretch during rewind operations, and permits higher tape leader parking speeds.

DESCRIPTION OF THE DRAWINGS

The items depicted in the drawings have been simplified, and may not be drawn to scale. The drawing figures are intended to show mainly those features associated with the invention. For the sake of clarity, many features required for tape cartridge functionality have been omitted. However, those having ordinary skill in the art of tape cartridge design and manufacture should have little difficulty incorporating the invention into existing single reel tape cartridge designs.

DETAILED DESCRIPTION OF THE INVENTION

FIGS. 1 through 4 depict a single reel tape cartridge which was developed by the Hewlett-Packard Company, and which is the subject of the pending patent applications referenced at the beginning of this document.

The present invention provides a resilient parking seat for the leader pin of a single reel tape cartridge. The resilient parking seat, which includes a resiliently-biased leader pin cradle assembly linearly movable between two positions, works in combination with a reel lock having discrete evenly-spaced locking positions, to prevent slack in the rewound tape during storage. The resilient parking seat also reduces stress on the tape as the leader pin enters the leader pin storage recess in the cartridge housing during rewind operations.

As the present invention can be readily incorporated into the single-reel tape cartridge of FIGS. 1 through 4, common numbering of like components in FIGS. 1 through 6 and 10 has been employed.

Figure 5:
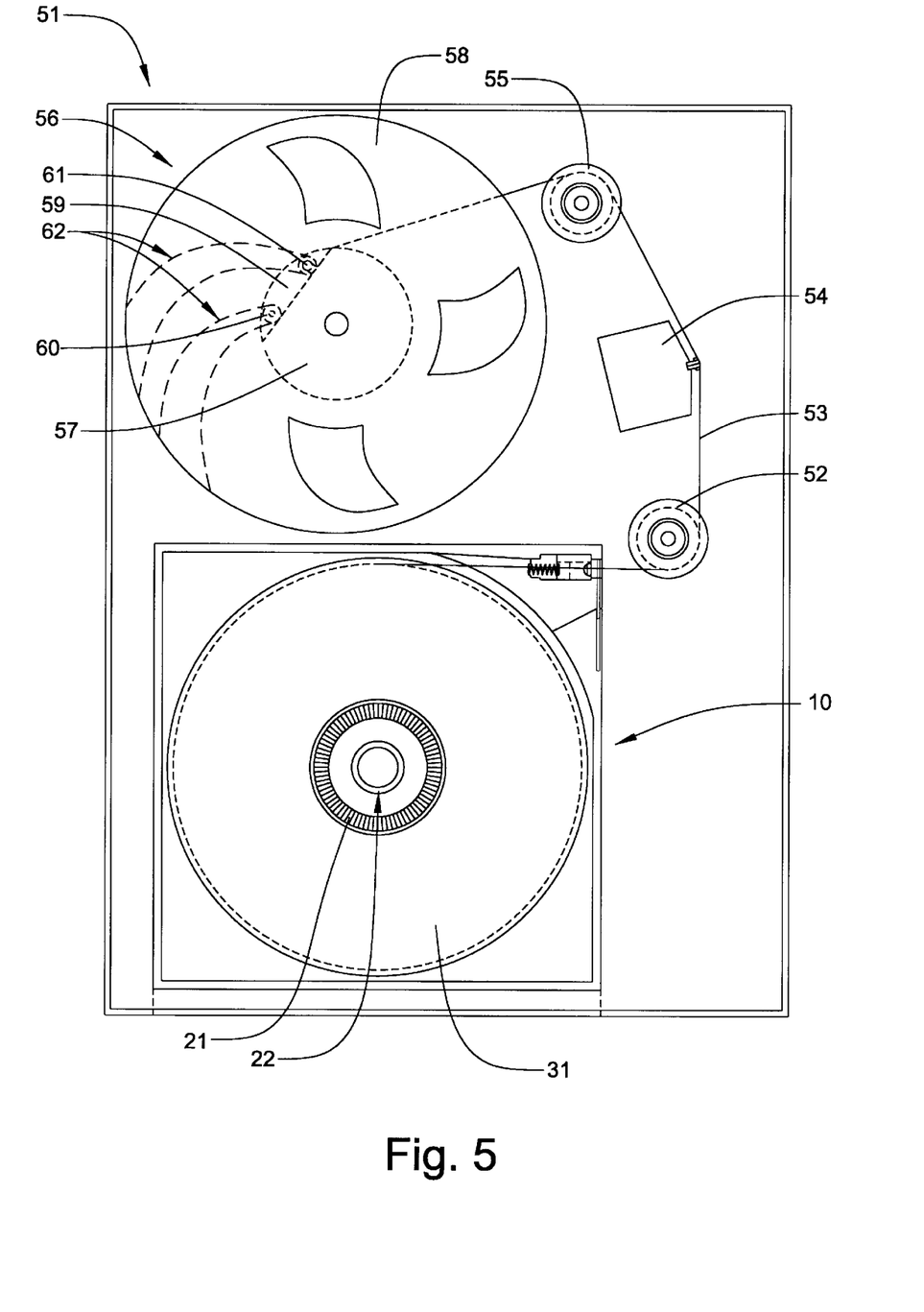
FIG. 5 is a cut-away top plan view of a single reel tape cartridge drive having a single reel tape cartridge inserted therein.

Referring now to FIG. 5, a single reel tape cartridge 10 which incorporates the invention has been inserted in a tape drive 51. It should be understood that no attempt has been made to show all the features of either the tape drive 51 or the tape cartridge 10. The purpose of this drawing, which is primarily a schematic diagram, is to show the path of the tape 53, which leads from the supply reel 31 of the cartridge 10, around a first idler pulley 52, over a read/write head 54, around a second idler pulley 55, to the take-up reel 56 of tape drive 51. The take-up reel 56 has a hub 57. The hub 57 is generally cylindrically shaped, but having a flattened side. The flattened side is shaped to receive a primer block 59 which has both a locator pin 60 and a leader pin 61 clipped thereto. The flanges 58 of take-up reel 56 has locating grooves 62 which guide the ends of the locator pin 60 and the ends of the leader pin 61, directing the primer block 59 to its proper location against the flattened side of hub 57 as the tape is wound onto the take-up rel 56. The primer block 59 is shaped so that it completes the cylindrical shape of hub 57 when attached to the flattened side thereof. Because this drawing figure may be considered a schematic diagram, the driven gear 21 is depicted as though made of transparent material. Ordinarily, it would appear as shown only in a bottom view. No attempt has been made to depict the tape priming mechanism, the tape drive electronics, the controls, the driver gear 36 which engages the driven gear 21, or many other hardware features essential for tape drive operation. The central aperture 22 in the driven gear 21, through which the projection 39 on the driver gear 36 lifts the second locking gear 35 (please refer to FIGS. 3 and 4) and thereby disengages the reel locking mechanism 30, is clearly visible in this view.

Figure 6:
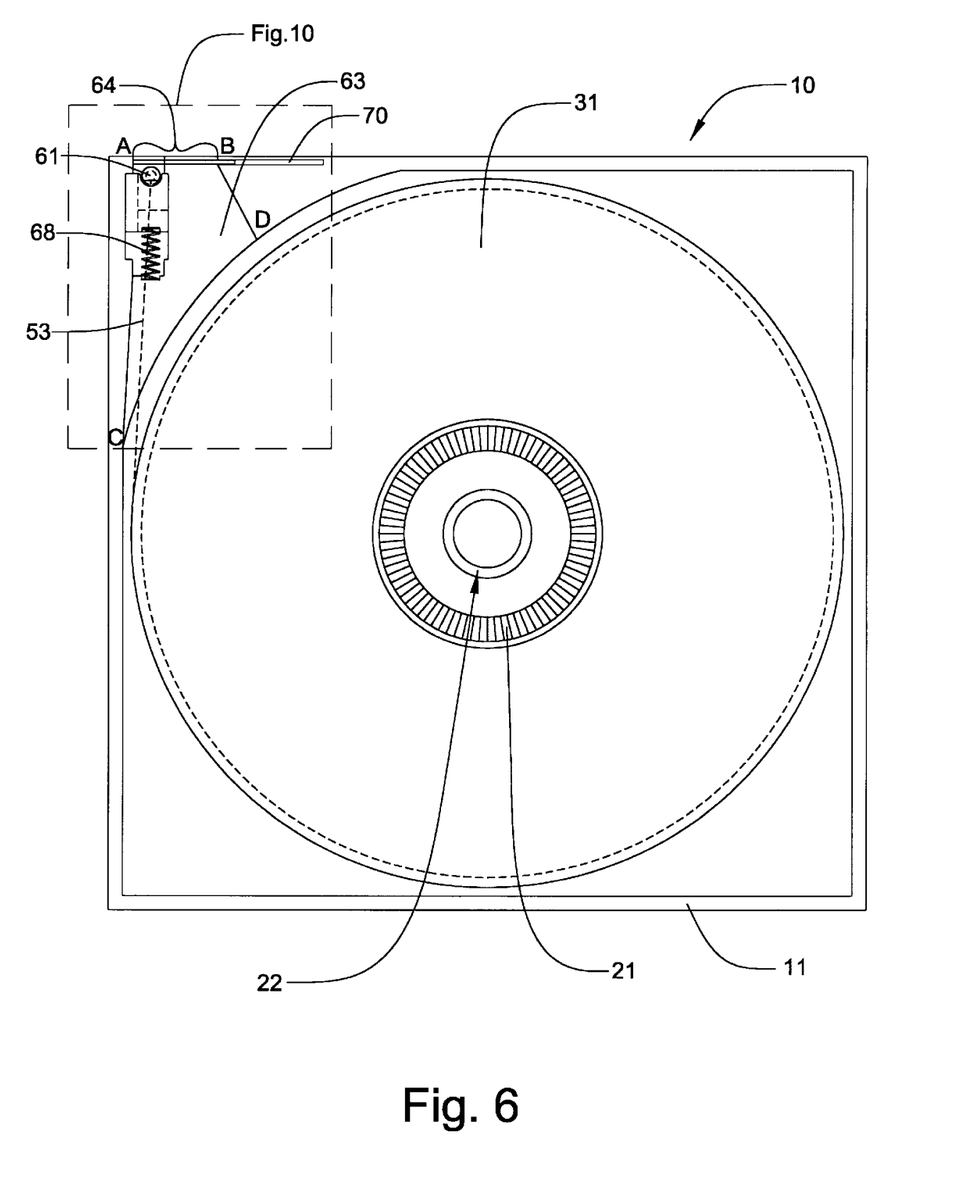
FIG. 6 is a cut-away top plan view of a single reel tape cartridge which incorporates the invention.
Figures 7, 8:
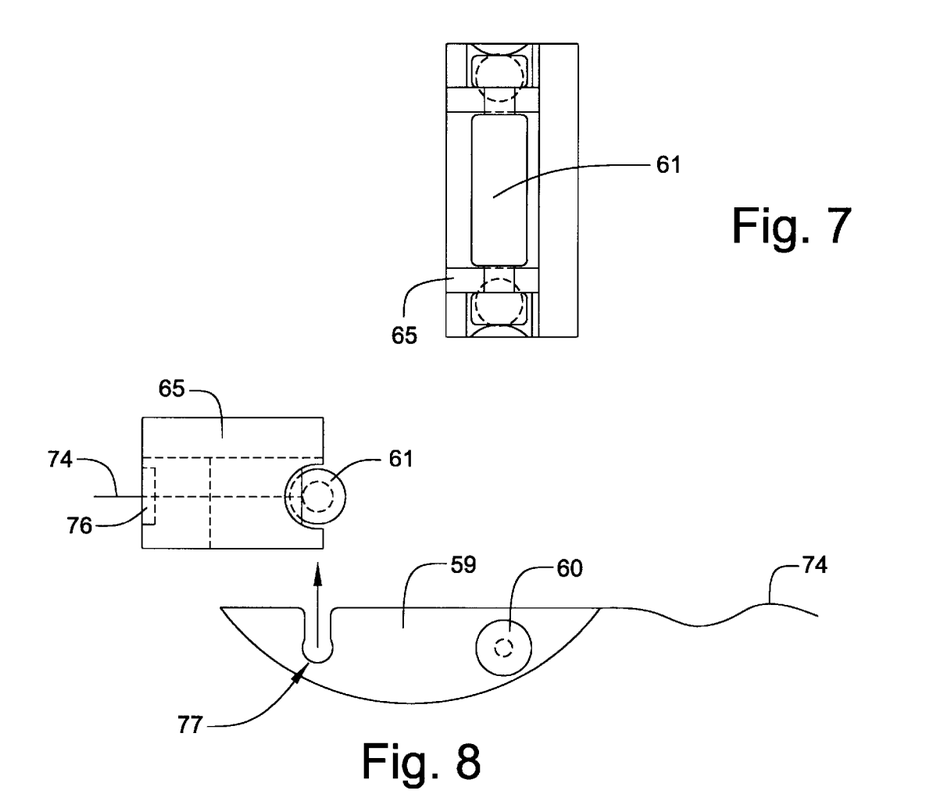
FIG. 7 is a front elevational view of a cradle assembly in which is seated a leader pin.
FIG. 8 is a top plan view of a cradle assembly in which is seated a leader pin and a primer block about to be attached to the leader pin.
Figure 10:
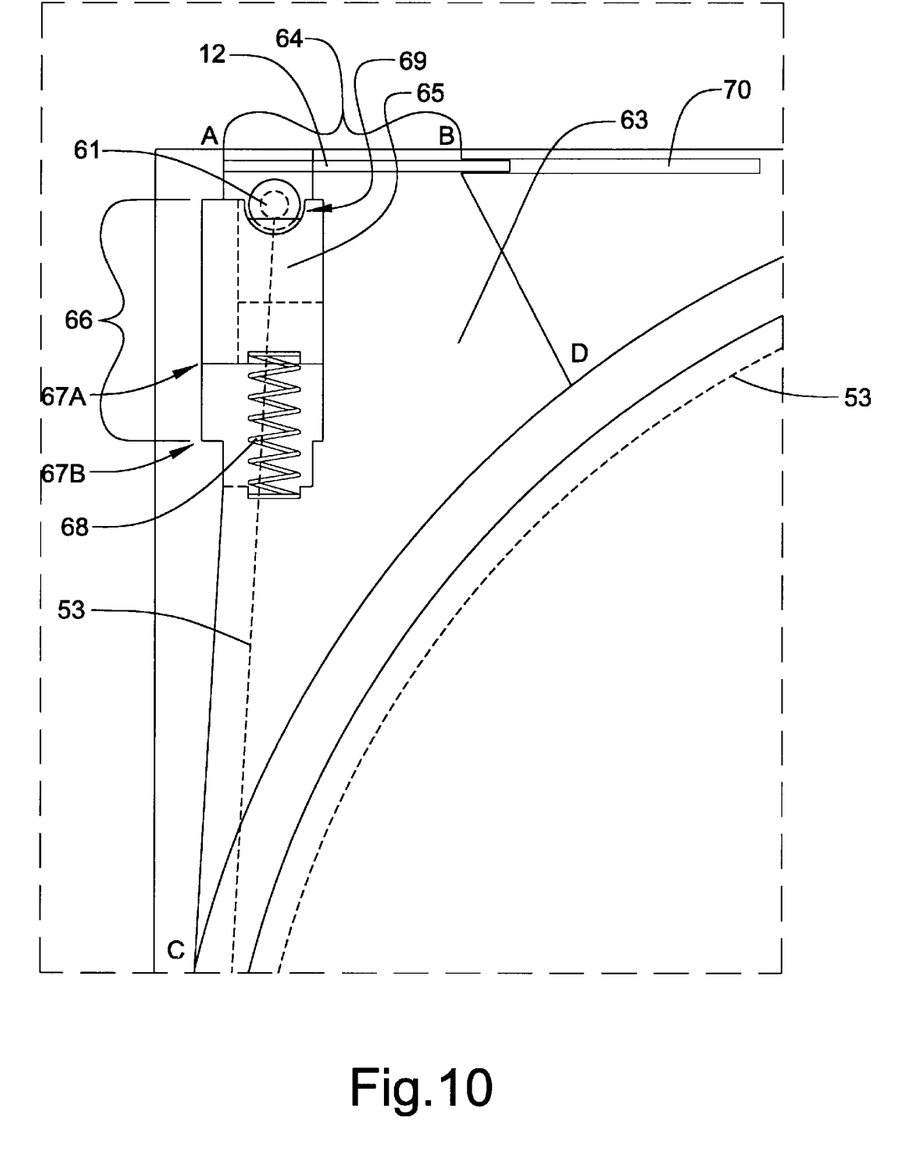
FIG. 10 is a close-up view of the region of FIG. 6 which incorporates the invention.

Referring now to FIGS. 6, 7 and 10, the single reel tape cartridge 10 of FIG. 5 is shown separate from the tape drive 51. The cartridge 10 has a supply reel 31 with a driven gear 21 centrally and axially incorporated therein. Also visible in this view are the reel lock release aperture 22, a leader device (in this case a leader pin) 61, and a tape access port 63 within the cartridge housing 11. The access port 63, which is a passage way in the cartridge housing roughly within the confines of a polygon having apices A, B, C, and D, has a slidable access door 12 across the opening 64 of access port 63. The cartridge 10 may have a leader tape which connects the leader pin 61 to the magnetic tape 53 (see FIG. 5), which is in turn anchored to the tape supply reel 31. For a preferred embodiment of the invention, no leader tape is utilized between the magnetic tape 53 and the leader pin 61. The leader pin 61 is seated in a cradle assembly 65 which is linearly movable within a cradle recess 66 between a first position 67A and a second position 67B within access port 63. The cradle assembly 65 is resiliently biased by a pair of compressible coil springs 68 (only one is visible in this view) toward the tape access port opening 64. The springs 68 are compressed between the cradle assembly 65 and the cartridge housing 11. It will be noted that the cradle assembly 65 is notched to receive the leader pin 61. The notches 69 (only one is visible in this top plan view) prevent side movement of the leader pin 61.

Figure 9:
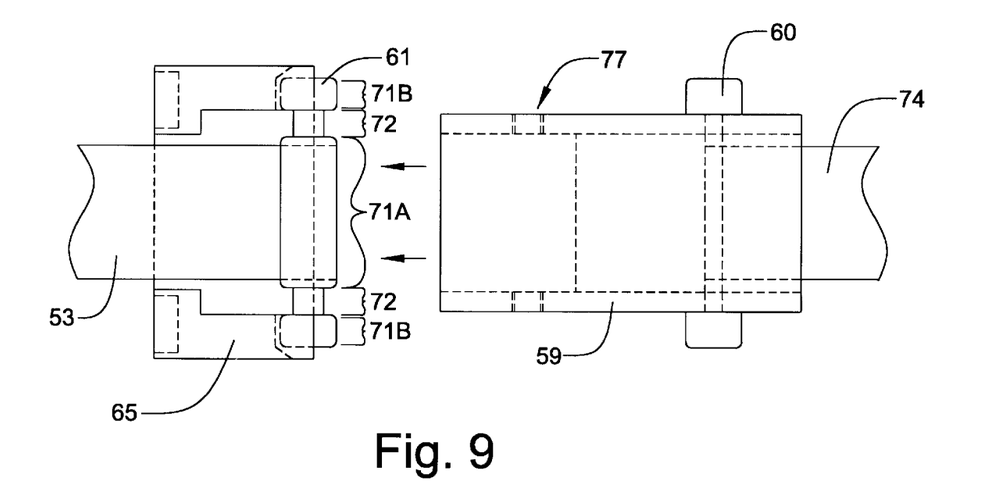
FIG. 9 is a side elevational view of both a primer block and cradle assembly in which is seated a leader pin that is attached to an end of the magnetic tape.

For a preferred embodiment of a single-reel tape cartridge 10 which incorporates the invention, a brief explanation of how the priming mechanism works is in order. Referring now to FIGS. 7, 8 and 9, the leader pin 61 is generally rod, or cylindrically shaped, having a central portion 71A to which the magnetic tape 53 is attached, two reduced diameter portions 72 on either side of the central portion 71A, and two end portions 71B, which are of the same diameter as the central portion 71A. Leader devices other than leader pin 61 are contemplated by this invention. For example, the leader device may be block shaped, or the free end of the magnetic tape 53 may be reinforced with a capturable T-shaped laminar tab. In the latter case, the tape would be attached to the vertical portion of the "T", and the cradle assembly 65 would capture the horizontal portions of the "T" as the tape 53 is rewound. A first end of a leader tape 74 is anchored to the take-up reel 56 of the tape drive 51 and passes over the read/write head 54 of tape drive 51 (see FIG. 5). A second end of the leader tape 74 is attached to a primer block 59 that has a pair of grooves 77 which are adapted to clip around the narrow portions 72 of leader pin 61 as the leader pin 61 is being held at both ends 71B by the cradle assembly 65. The length of the leader tape 74 is indexed to the diameter of take-up reel hub 58 so that as the primer tape 74 winds onto the take-up reel 56, the primer block 59 and attached leader pin 61 will fit against the flattened side of the reel hub 57. After the primer block 59 and attached leader pin 61 are fitted to the flattened side of reel hub 57, the magnetic tape 53 winds around the hub 57 and primer block 59. The priming mechanism captures the primer block 59 and detaches it from the leader pin 61 whenever the magnetic tape 53 is fully rewound into the cartridge 10. When a new cartridge is inserted into the tape drive, the priming mechanism attaches the primer block 59 to the leader pin 61. The priming mechanism attaches and detaches the primer block 59 to and from the leader pin 61 in a direction that is generally perpendicular to the tape exit path, as lateral movement of the cradle assembly 65 is constrained by the cradle recess 66. Lateral movement of the leader pin 61 in that direction is constrained by notches 68 in cradle assembly 65. As the priming mechanism is not the focus of this disclosure, it is not graphically depicted herein. Each of the biasing springs 68 fits into a recess 76 in cradle assembly 65.

Referring now to FIG. 10, the details of the cradle assembly 65, the tape access port 63 and cradle recess 66 are more clearly visible. The cradle assembly 65, when viewed along the tape exit path, is C-shaped in order to provide clearance for the tape 53 as the tape's exit angle changes as it is unwound from the tape supply reel 31. As the angle at which the tape 53 enters the cradle assembly 65 varies depending on the amount of tape which has been unwound from the cartridge tape supply reel 31, the cradle assembly 65 must be open on one side. The access door 12 is held in a normally shut position with a door closing spring (not shown). When inserted within the tape drive, the door 12 is pushed rearward into a door recess 70, opening the tape access port 63.

Although only one embodiment of the invention has been described herein, it will be obvious to those having ordinary skill in the art of tape cartridge design and manufacture, that changes and modifications may be made thereto without departing from the scope and spirit of the invention as hereinafter claimed. For example, as explained in the background section of this disclosure, the couplers which impart rotational movement to the tape supply reel, though disclosed as geared devices, may also be any other type of coupler known in the art. That is, they may be splined or be friction coupled. In addition, other types of biasing devices may be used in place of the coil springs 68. One or more leaf or torsion springs might be substituted for the coil springs. In addition, one or more compressible pads made of resilient foam might also be substituted for springs. Although open-pore foam material might provide energy absorbing action as the air is forced out of the pores as the foam collapses, foam manufactured from polymeric compounds may lose its ability to expand to its original dimensions if compressed for extended periods.

What is claimed is:

1. In combination with a single reel tape cartridge having a tape supply reel enclosed within a cartridge housing having a tape access port, a data storage tape having a first end thereof coupled to the supply reel and a second end thereof coupled to a leader device, a resilient parking seat for the leader device, said parking seat comprising:

a cradle assembly slidably movable within said access port along a path taken by said tape as it enters and exits said cartridge, said cradle assembly having at least one notch which receives said leader device when said tape is fully rewound onto said supply reel;

means for biasing said cradle assembly in a tape exiting direction.

2. The parking seat of claim 1, wherein said means for biasing comprise at least one coil spring compressible between said cradle assembly and said cartridge housing.

3. The parking seat of claim 1, wherein said cradle assembly has a C-shaped cross section and a channel formed by the C-shaped cross section through which said path is directed.

4. The parking seat of claim 3, wherein said means for biasing comprises a pair of coil springs, one of which is positioned above the tape path, the other of which is positioned below the tape path.

5. The parking seat of claim 1, wherein said cradle assembly is linearly slidable between first and second positions.

6. The parking seat of claim 5, wherein the distance between said first and second positions is greater than any amount of slack that may be present in said tape when, after said tape is rewound on said tape supply reel, further rotation of said reel is prevented by the engagement of a reel locking device.

7. A single reel tape cartridge for insertion within a tape drive unit, said cartridge comprising:

a cartridge housing having a tape access port;

a tape supply reel enclosed within said housing, said reel rotatable about a rotational axis;

a driven coupler axially affixed to said reel, said driven coupler being adapted to engage a rotatable powered driver coupler of said tape drive unit and thereby couple rotary motion of the driver coupler to said reel;

a magnetic tape having a first end permanently attached to said supply reel and a second end coupled to a leader device, said tape and leader device being extricable from said cartridge by said tape drive;

a first locking gear affixed to and rotatable with said driven coupler, said first locking gear having a first set of teeth and a center coincident with said rotational axis;

a second locking gear non-rotatably affixed to said housing, said second locking gear being movable along said rotational axis and having a second set of teeth and a center coincident with said rotational axis, said non-rotatable locking gear second set of teeth adapted to engage said first set of teeth and prevent unwinding of said tape from said reel;

a cradle assembly slidably movable within said access port along a path by which said tape enters and exits said housing, said cradle receiving said leader device and restraining lateral movement of said leader device when said tape is fully rewound onto said supply reel;

means for biasing said assembly in a tape-exiting direction.

8. The tape cartridge of claim 7, wherein said means for biasing comprise at least one coil spring compressible between said cradle assembly and said cartridge housing.

9. The tape cartridge of claim 7, wherein said cradle assembly is linearly slidable between first and second positions.

10. The tape cartridge of claim 9, wherein said supply reel is lockable at a plurality locations within said housing, each location being equiangularly spaced from adjacent locations.

11. The tape cartridge of claim 10, wherein the distance between said first and second positions is greater than the circumference of an outmost loop of said tape when fully rewound, divided by the number of locations at which said reel is lockable.

12. The parking seat of claim 7, wherein said cradle assembly has a C-shaped cross section and a channel formed by the C-shaped cross section through which said path is directed.

13. The parking seat of claim 12, wherein said means for biasing comprises a pair of coil springs, one of which is positioned above the tape path, the other of which is positioned below the tape path.

14. A single reel tape cartridge for insertion within a tape drive unit, said cartridge comprising:

a cartridge housing having a tape access port;

a tape supply reel enclosed within said housing, said reel rotatable about a rotational axis;

a driven coupler axially affixed to said reel, said driven coupler being adapted to engage a rotatable powered driver coupler of said tape drive unit and thereby couple rotary motion of the driver coupler to said reel;

a magnetic tape having a first end permanently attached to said supply reel and a second end coupled to a leader device, said tape and leader device being extricable from said cartridge by said tape drive;

a reel lock adapted to lock said supply reel at any one of a plurality locations within said housing;

a cradle assembly slidably movable within said access port along a path by which said tape enters and exits said housing, said cradle assembly receiving said leader device and restraining lateral movement of said leader device when said tape is fully rewound onto said supply reel;

means for biasing said cradle assembly in a tape exiting direction.

15. The tape cartridge of claim 14, wherein said means for biasing comprise at least one coil spring compressible between said cradle assembly and said cartridge housing.

16. The tape cartridge of claim 14, wherein said cradle assembly is linearly slidable between first and second positions.

17. The tape cartridge of claim 14, wherein each of said plurality of locations at which said reel is lockable are equiangularly spaced from adjacent locations.

18. The tape cartridge of claim 17, wherein the distance between said first and second positions is greater than the circumference of an outermost loop of said tape when fully rewound, divided by the number of locations at which said reel is lockable.

19. The parking seat of claim 14, wherein said cradle assembly has a C-shaped cross section, a channel formed by the C-shaped cross section through which said path is directed, and a pair of notches on opposite sides of said channel which receive said leader device when said tape is fully rewound.

20. The parking seat of claim 19, wherein said means for biasing comprises a pair of coil springs, one of which is positioned above the tape path, the other of which is positioned below the tape path.

* * * * *